United States Patent
Kumar

(10) Patent No.: US 11,683,254 B1
(45) Date of Patent: Jun. 20, 2023

(54) RATE LIMIT AND BURST LIMIT ENHANCEMENTS FOR REQUEST PROCESSING

(71) Applicant: Salesforce, Inc., San Francisco, CA (US)

(72) Inventor: Dheeraj Kumar, New Delhi (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/574,332

(22) Filed: Jan. 12, 2022

(51) Int. Cl.
*H04L 43/0882* (2022.01)
*H04L 43/0894* (2022.01)
*H04L 67/02* (2022.01)
*H04L 47/2425* (2022.01)
*H04L 43/0811* (2022.01)
*H04L 67/60* (2022.01)

(52) U.S. Cl.
CPC ...... *H04L 43/0882* (2013.01); *H04L 43/0811* (2013.01); *H04L 43/0894* (2013.01); *H04L 47/2433* (2013.01); *H04L 67/02* (2013.01); *H04L 67/60* (2022.05)

(58) Field of Classification Search
CPC ............. H04L 43/0882; H04L 43/0811; H04L 43/0894; H04L 47/2433; H04L 67/02; H04L 67/60
See application file for complete search history.

(56) References Cited

U.S. PATENT DOCUMENTS

| | | | |
|---|---|---|---|
| 6,633,914 B1* | 10/2003 | Bayeh | H04L 9/40 709/227 |
| 6,799,276 B1* | 9/2004 | Belissent | H04L 47/193 726/14 |
| 8,015,233 B2* | 9/2011 | Li | H04L 61/4552 709/201 |
| 2010/0274922 A1* | 10/2010 | Reavely | H04L 67/145 709/238 |
| 2011/0191414 A1* | 8/2011 | Ma | H04L 67/14 709/203 |
| 2016/0241676 A1* | 8/2016 | Armstrong | G06F 16/24568 |

* cited by examiner

*Primary Examiner* — Benjamin M Thieu
(74) *Attorney, Agent, or Firm* — Holland & Hart LLP

(57) ABSTRACT

A method that includes establishing an open connection for responding to requests from clients supported by an application server. The method may further include establishing a set of queues configured for storing requests received from the client via the open connection. The method may further include selecting requests from the queues based on a rate limit threshold and burst limit threshold of the application server. The rate limit threshold may refer to a number of requests that the application server can process within a first time duration, while the burst limit threshold may refer to a number of requests that the application server can process within a second time duration that is shorter than the first time duration. The method may further include transmitting the requests to a set of data processing servers connected to the application server and receiving an indication that the requests have been processed.

20 Claims, 12 Drawing Sheets

US 11,683,254 B1

RATE LIMIT AND BURST LIMIT ENHANCEMENTS FOR REQUEST PROCESSING

FIELD OF TECHNOLOGY

The present disclosure relates generally to database systems and data processing, and more specifically to rate limit and burst limit enhancements for request processing.

BACKGROUND

A cloud platform (e.g., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cloud computing systems, an application server may receive a number of requests from a client. If the application server is unable to process all requests received from the client in a given time period, the application may drop (e.g., refrain from processing) some of the requests. Dropping requests may result in higher latency, greater signaling overhead, and lower client satisfaction.

DETAILED DESCRIPTION

Figure 1:
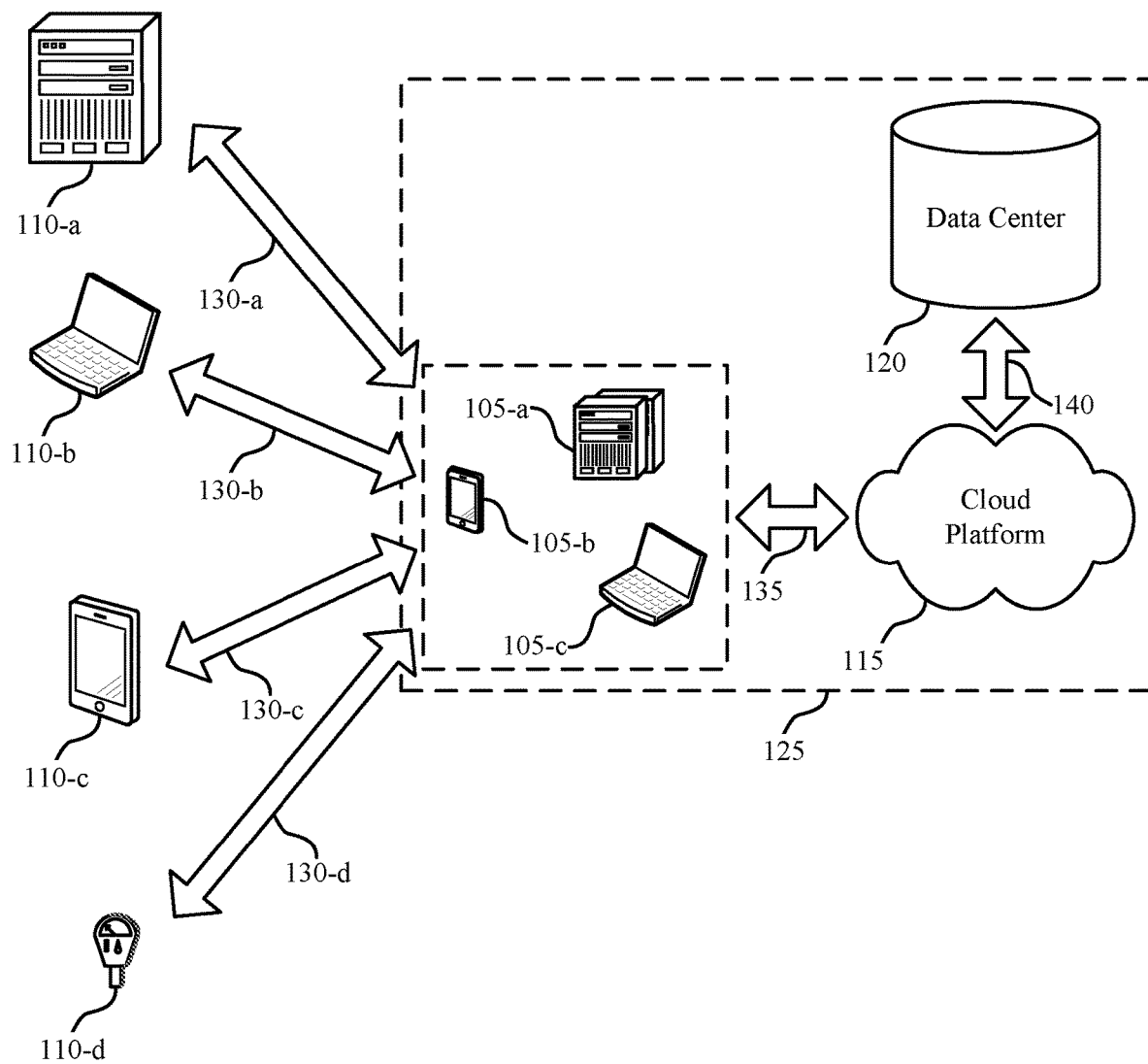
FIGS. 1 and 2 illustrate examples of data processing systems that support rate limit and burst limit enhancements for request processing in accordance with aspects of the present disclosure.

Clients of a cloud platform may transmit and receive information from servers associated with the cloud platform. As described herein, a client may be an example of a web browser application or a client specific application at a user device such as a laptop, a desktop, a mobile device, or a service utilizing application program interface (API), among other examples. A client of the cloud platform (also referred to as a cloud client) may create or manipulate data stored at the cloud platform by sending requests to a server. In event-based environments, the server may handle each request as a separate event. To support this functionality, the server may establish an open connection with each client. This open connection may persist until the server has processed all requests from that specific cloud client.

In some cases, the server may receive multiple requests from a single client. For example, a client may update thousands of documents or records stored on the cloud platform. If, for example, the client sends multiple requests to the server within a short time span, the server may be unable to handle requests from other clients (e.g., due to processing capabilities of the server). Furthermore, if the number of requests received by the server within a time period exceeds a threshold, the server may drop (e.g., refrain from processing) some of the requests, which may result in data loss, increased latency, and decreased client satisfaction. The implementations described herein provide methods to efficiently regulate and process requests from multiple clients in an event-based environment.

In accordance with aspects of the present disclosure, an application server may reduce the number of dropped requests and improve the processing efficiency of handling event-based requests via an open connection by configuring a set of queues for each client. In some examples, the application server may configure multiple queues for each client, where each queue is configured to store requests with a specific priority level or request type. The application server may select and process requests from these queues based on rate limit and burst limit capabilities of the application server. As described herein, a rate limit may refer to a total number of requests that the application server can process within a given time interval, and a burst limit may refer to a number of requests that the application server can process from a single client in a given time interval. After selecting requests from the queues, the application server may process the requests or relay the requests to other servers. After the requests have been processed (e.g., by the application server or the other servers), the application server may transmit a notification to the client (e.g., the client that originally sent the requests).

The application server may determine which requests to select (e.g., referred to as popping a request) from a queue by using sliders (e.g., sequential groups of requests within a given queue) that are defined by a start pointer (e.g., a first request in the slider) and an end pointer (e.g., a last request in the slider). The application server may use a first slider (corresponding to a rate limit capability of the application server) and a second slider (corresponding to a burst limit capability of the application server) to pop requests from different queues. Requests that are positioned between a start pointer and an end pointer of the first slider may be considered valid (e.g., eligible for processing) from a rate limit perspective. In other words, the application server may process the requests in the first slider without exceeding a rate limit capability of the application server. The application server may increment the start pointer and the end pointer of the first slider if a time difference between the start pointer and a subsequent request (e.g., a request that is not currently in the first slider) is below a predefined threshold. In a similar manner, requests that are positioned between a start pointer and an end pointer of the second slider may be considered valid from a burst limit perspective. In other words, the application server may process the requests in the second slider without exceeding a burst limit capability of the application server. The application server may increment the starting pointer of the second slider if, for example, a fixed time has elapsed and all requests between the start pointer and end pointer of the second slider have been processed (e.g., if the second slider is empty). In some examples, the application server may pop (e.g., select for processing) requests that are present in both the first and second sliders.

In some examples, the application server may configure multiple queues for a single client, where each queue corresponds to a specific priority level or request type. The application server may also record a timestamp for each request, and may use the timestamp to determine which requests to pop from a given queue. Additionally, the application server may append a flag to each request to indicate whether the request has been processed or not. In some examples, each queue may be configured with a maximum size that depends on a processing capability of the application server or a number of clients supported by the application server. The techniques and operations described herein may enable the application server to apply rate limit and burst limit constraints to event-based requests received from cloud clients via an open connection.

Aspects of the disclosure are initially described in the context of an environment supporting an on-demand database service. Aspects of the disclosure are further described in the context of data processing systems, request processing architectures, queue management systems, and process flows. Aspects of the disclosure are further illustrated by and described with reference to apparatus diagrams, system diagrams, and flowcharts that relate to rate limit and burst limit enhancements for request processing.

FIG. 1 illustrates an example of a data processing system 100 for cloud computing that supports rate limit and burst limit enhancements for request processing in accordance with various aspects of the present disclosure. The data processing system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data center 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In an event-based environment, API calls may be processed as events on an application server (e.g., requests and responses may be treated as events). There may be n number of nodes designated to process a single event and generate a response event. In such an environment, the application server may block a thread (e.g., processing resources and information required to handle requests) for each client request. In other words, the application server may block n number of threads to process n number of requests from a cloud client 105. Requests from a cloud client 105 may be managed by an API Gateway that uses a rate limit and a burst limit to control the flow of requests from cloud clients 105.

In some cases, a cloud client 105 may connect to an application server using a WebSocket or server-side event-based connection. As described herein, WebSocket may refer to a communications protocol that provides full-duplex communication channels over a single transfer control protocol (TCP) connection. For example, a cloud client 105 may send an event-based request to the application server, and may receive an event-based response when the application server is ready to send the data. In such cases, the application server may block one thread to process all requests from the cloud client 105. However, effectively implementing rate limit and burst limit controls for event-based requests via an open connection (e.g., a long-lived connection, a persistent connection) may be difficult because each event-based operation may be asynchronous. Additionally, different requests may have different processing requirements. If a cloud client 105 has exhausted an API usage limit, high priority requests may be stored and executed when the API usage limit is reset.

The techniques described herein may support efficient rate limit control and burst limit control capabilities for event-based cloud computing environments. In accordance with aspects of the present disclosure, a server may maintain a queue to store requests from cloud clients 105, and may record times at which the application server receives each request (e.g., rather than recording the number of requests received). These requests may be popped (e.g., selected) from the queue when the application server is ready to process the requests. The application server may maintain one queue and two sliders for each cloud client 105, as described with reference to FIGS. 2-4. A slider may refer to a sequential group of requests in the queue of some length, and may be defined by a start pointer (e.g., a pointer to a first request in a given queue) and an end pointer (e.g., a pointer to a last request in a given queue).

The application server may use a first slider to implement rate limit control (e.g., to regulate the total number of requests that the application server processes within a time period). Likewise, the application server may use a second slider to perform burst limit control (e.g., to control the number of requests that the application server receives from each cloud client 105 within a time period). The first slider (e.g., the rate limit slider) may be configured as a modified sliding log rate limiting slider that tracks a time-stamped log for each request. The first slider may move to the next request in a given queue if a difference between a first request in the first slider (e.g., the start pointer) and a last request in the first slider is within a specified limit. All requests within the first slider may be considered valid (e.g., ready to be processed) from a rate limit perspective. In some examples, the length of the first slider may be configured as a constant value. If the number of requests in the first slider exceeds a threshold length, the application server may adjust the queue length to store requests based on a time at which the next window will be available. Alternatively, the application server may reject requests if a maximum size of a queue is exceeded (e.g., if the queue becomes full).

The second slider may have a constant size, and may control the number of requests that are popped (e.g., selected) from the queue at a given time. The second slider may be moved (e.g., incremented) if all requests within the second slider have been processed, if a fixed time has passed (e.g., from a previous move), and if previously processed requests have moved through the first slider (e.g., the rate limit slider). The application server may pop a request from a queue if the request has moved through the first slider and is present in the second slider.

In some implementations, the application server may maintain multiple queues with different configurations that correspond to different types of requests (e.g., different priority levels). When a cloud client 105 connects with a server through a WebSocket or server-side event-based connection, the connection may persist (e.g., remain open) for a period of time. In some cases, the application server may be able to maintain a large number (e.g., 40,000 to 60,000) open ports at a given time. As a result, the application server may be capable of maintaining a large number of open connections with different cloud clients 105. Active cloud clients 105 of the application server may be distributed among multiple connected servers, which may be referred to herein as data processing servers.

In some cases, the application server (or a server administrator) may determine a suitable number of cloud clients 105 for each of the connected servers. For example, if a cloud client 105-*a* sends X requests per minute, the cloud client 105-*a* may have a corresponding queue of length L1 such that X is greater than L1. Similarly, if a cloud client 105-*b* can send Y requests per minute, the cloud client 105-*b* may have a corresponding queue of length L2 such that Y is greater than L2. If a server has a memory capacity of M gigabytes (GB) and the average request size is N kilobytes (KB) with a maximum request size of P KB, the average number of requests per server can be calculated as S=M/N. The maximum number of requests per server can be calculated as T=M/P. The average number of cloud clients 105 distributed to a server can be calculated as V=S/((L1+L2)/2). The maximum number of cloud clients 105 on a server can be calculated as T/maxOf(L1L2). Using these equations, the application server (or a server administrator) can determine both a suitable number of cloud clients 105 per server and a suitable maximum queue length. In some cases, these values may change as the number of cloud clients 105 served by each server increases or as more data regarding the queue size and number of cloud clients 105 becomes available.

If, for example, the application server is processing a relatively low number of requests at a given time, the application server may enter an idle mode. In some examples, the application server may be configured to postpone processing the requests until a new window becomes available (e.g., rather than processing the requests in a current window). In other cases, the application server may be configured to process the requests and flag them as processed. In other words, if the application server is idle (e.g., if the application server is processing fewer requests than the application server can handle), the application server may process remaining requests in the queue (e.g., without popping requests from the queue), and may mark them as processed. In this way, the application server may ensure that requests are processed once within an appropriate window.

Moreover, because each cloud client 105 may have a corresponding set of queues, the application server may distribute a request to an appropriate queue and process the request immediately (e.g., upon receiving the request) if the request is within the current window. Otherwise, the application server may postpone processing the request until a new window becomes valid for that queue. Thus, receiving a large number of requests from a given cloud client 105 may not prevent the application server from processing requests from other clients.

In one example utilization of the data processing system 100, a cloud client 105-*a* may attempt to update customer records stored at a server. The cloud client 105-*a* may alter several customer records by updating email addresses, phone numbers, and shipping addresses. Meanwhile, a cloud client 105-*c* may update company financial records stored on the application server. The application server may receive the requests to update both the customer records and the company financial records, and may create a queue associated with each cloud client 105. The two requests may be stored in separate queues. When the application server receives each request, the application server may generate a timestamp corresponding to each request, and may assign each request to an appropriate queue. The application server may further sort the requests by priority or request type. When a request in the queue has passed through multiple sliders (e.g., a rate limit slider and a burst limit slider), the application server may pop the request from the queue to be processed. When the requests have been processed (e.g., by the application server or another cloud server), the application server may transmit an indication to each of the cloud clients 105.

It should be appreciated by a person skilled in the art that one or more aspects of the disclosure may be implemented in a data processing system to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
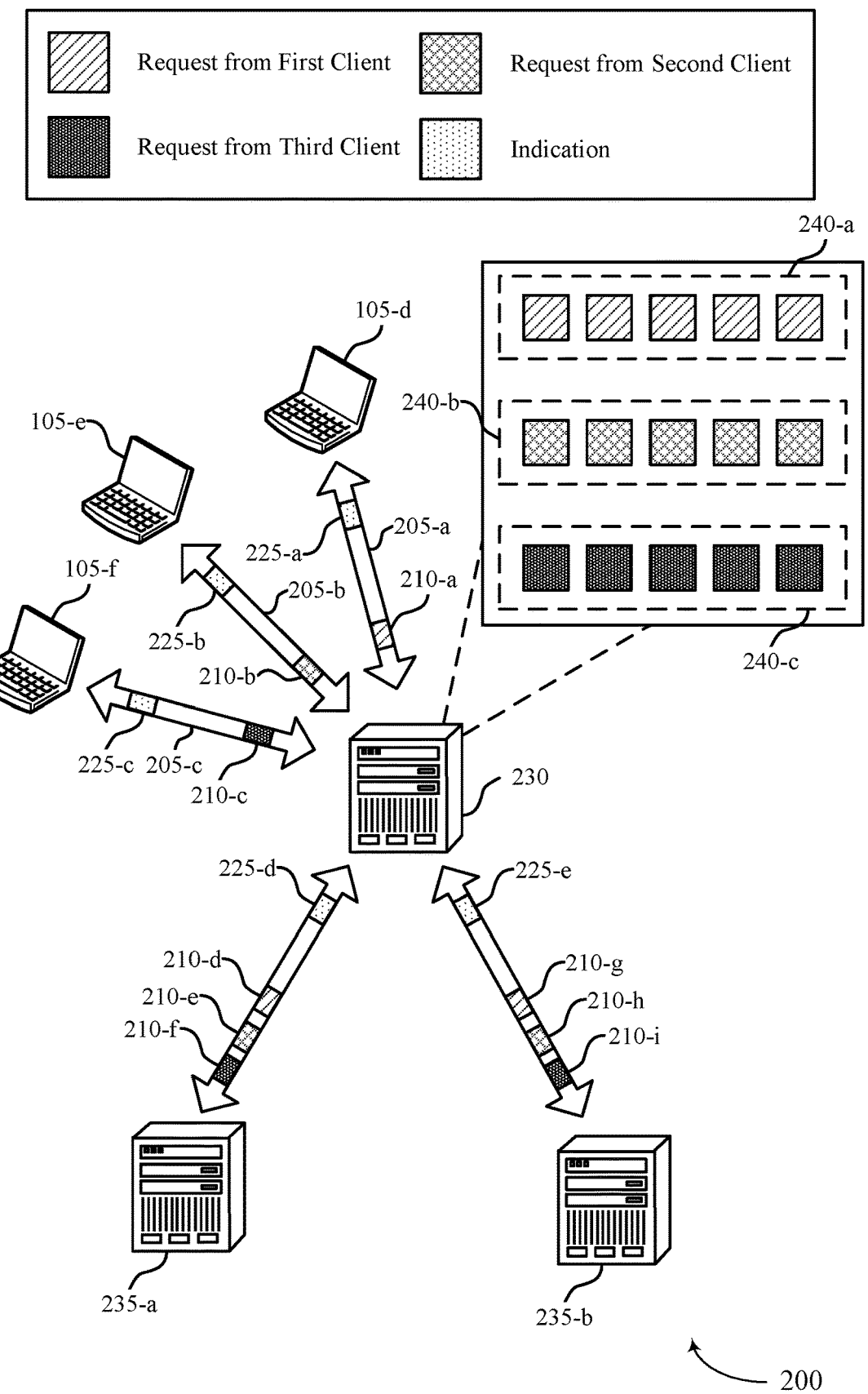

FIG. 2 illustrates an example of a data processing system 200 that supports rate limit and burst limit enhancements for request processing in accordance with aspects of the present disclosure. The data processing system 200 may implement or be implemented by aspects of the data processing system 100. For example, the data processing system 200 may include an application server 230 and data processing servers 235, which may be examples of aspects of a cloud platform 115 described with reference to FIG. 1. The data processing system 200 may also include clients 105, which may be examples of cloud clients 105 described with reference to FIG. 1. In the data processing system 200, the application server 230 may use queues 240 and sliders to implement rate limit and burst limit controls in an event-based cloud computing environment.

In the example of FIG. 2, the clients 105 may send requests to the application server 230 after establishing open (e.g., persistent, long-term) connections with the application server 230 (e.g., using WebSocket or event-based server-side technology). For example, a client 105-*d* may send a request 210-*a* to the application server 230 via an open connection 205-*a*. Similarly, a client 105-*e* may transmit a request 210-*b* to the application server 230 via an open connection 205-*b*. Likewise, a client 105-*f* may transmit a request 210-*c* to the application server 230 via an open connection 205-*c*.

As described herein, the application server 230 may configure queues 240 to store requests 210 from the clients 105. For example, the application server 230 may configure a queue 240-*a* to store requests 210 from the client 105-*d*, a queue 240-*b* to store requests 210 from the client 105-*e*, and a queue 240-*c* to store requests 210 from the client 105-*f*. As such, the application server 230 may store the request 210-*a* from the client 105-*d* in the queue 240-*a* corresponding to the client 105-*d*. Similarly, the application server 230 may store the request 210-*b* in the queue 240-*b*, and may store the request 210-*c* in the queue 240-*c*. In some examples, each of the queues 240 may be specific to a priority level or a request type. For example, the queue 240-*c* may store requests 210 from the client 105-*f* that are associated with a first priority level.

The application server 230 may be configured with a rate limit that defines a maximum number of requests 210 that the application server 230 can process in a given time interval. Similarly, the application server 230 may be configured with a burst limit that defines a maximum number of requests 210 that each of the clients 105 can transmit to the application server 230 in a given time interval. If the application server 230 is unable to process all requests 210 in the current time window, the application server 230 may store some or all of the requests 210 in the queues 240 such that the application server 230 or the data processing servers 235 can process these requests 210 in a subsequent time window. In other words, the application server 230 may delay processing of some requests 210 until a later time window, as opposed to dropping (e.g., not processing) requests 210 that exceed rate limit or burst limit capabilities of the application server 230.

As described herein, the application server 230 may use a set of sliders (e.g., a set of consecutive requests within a given queue) to determine which requests 210 to pop (e.g., select) from the queues 240. These sliders may enable the application server 230 to perform rate limiting and burst limiting in an event-based cloud computing environment without an API gateway. For example, the application server 230 may use a first slider to implement rate limit control, and may use a second slider to implement burst limit control. The application server 230 may pop requests 210 that are present in the second slider and have passed through the first slider.

After selecting requests 210 from the queues 240, the application server 230 may process the selected requests 210 or forward the requests 210 to the data processing servers 235. For example, the application server 230 may forward a request 210-*d* from the client 105-*d*, a request 210-*e* from the client 105-*e*, a request 210-*f* from the client 105-*f*, or a combination thereof to a data processing server 235-*a*. Similarly, the application server may forward (e.g., relay, transmit) a request 210-*g* from the client 105-*d*, a request 210-*h* from the client 105-*e*, a request 210-*i* from the client 105-*f*, or a combination thereof to a data processing server 235-*b*. In some examples, the application server may receive a request in a first time period, store the request in an appropriate queue, and forward the request to one of the data processing servers 235 in a second time period that is subsequent to the first time period.

After the application server 230 forwards requests 210 to the data processing servers 235, the data processing servers 235 may process the requests 210 and send indications 225 back to the application server 230. For example, the data processing server 235-*a* may transmit an indication 225-*d* to the application server 230 after processing the request 210-*d*, the request 210-*e*, and the request 210-*f*. Likewise, the data processing server 235-*b* may transmit an indication 225-*e* to the application server 230 after processing the request 210-*g*, the request 210-*h*, and the request 210-*i*. In some examples, the indications 225 may include information related to the requests 210 or responses to the requests 210. Upon receiving the indications 225 from the data processing servers 235, the application server 230 may transmit indications 225 to the clients 105. For example, the application server 230 may transmit an indication 225-a to the client 105-d via the open connection 205-a. Similarly, the application server 230 may transmit an indication 225-b to the client 105-e via the open connection 205-b, and may transmit an indication 225-c to the client 105-f via the open connection 205-c.

The data processing system 200 may enable the application server 230 to perform rate limit control and burst limit control in an event-based environment (e.g., with or without an API gateway). For example, after receiving requests 210 from the clients 105 via open connections, the application server 230 may use a first slider (e.g., a rate limit slider) and a second slider (e.g., a burst limit slider) to regulate how many requests 210 the application server 230 receives from a single client in a given time period and how many requests 210 the application server 230 processes in a given time period. To support this functionality, the application server 230 may establish queues 240 for the clients 105, and may use the first and second sliders to determine which requests 210 to pop (e.g., select) from the queues 240. Using the queues 240 in combination with sliders may enable the application server 230 to respond to requests 210 from a larger number of clients 105, and may reduce a number of requests 210 that are dropped (e.g., not processed) by the application server 230, among other benefits.

Figure 3:
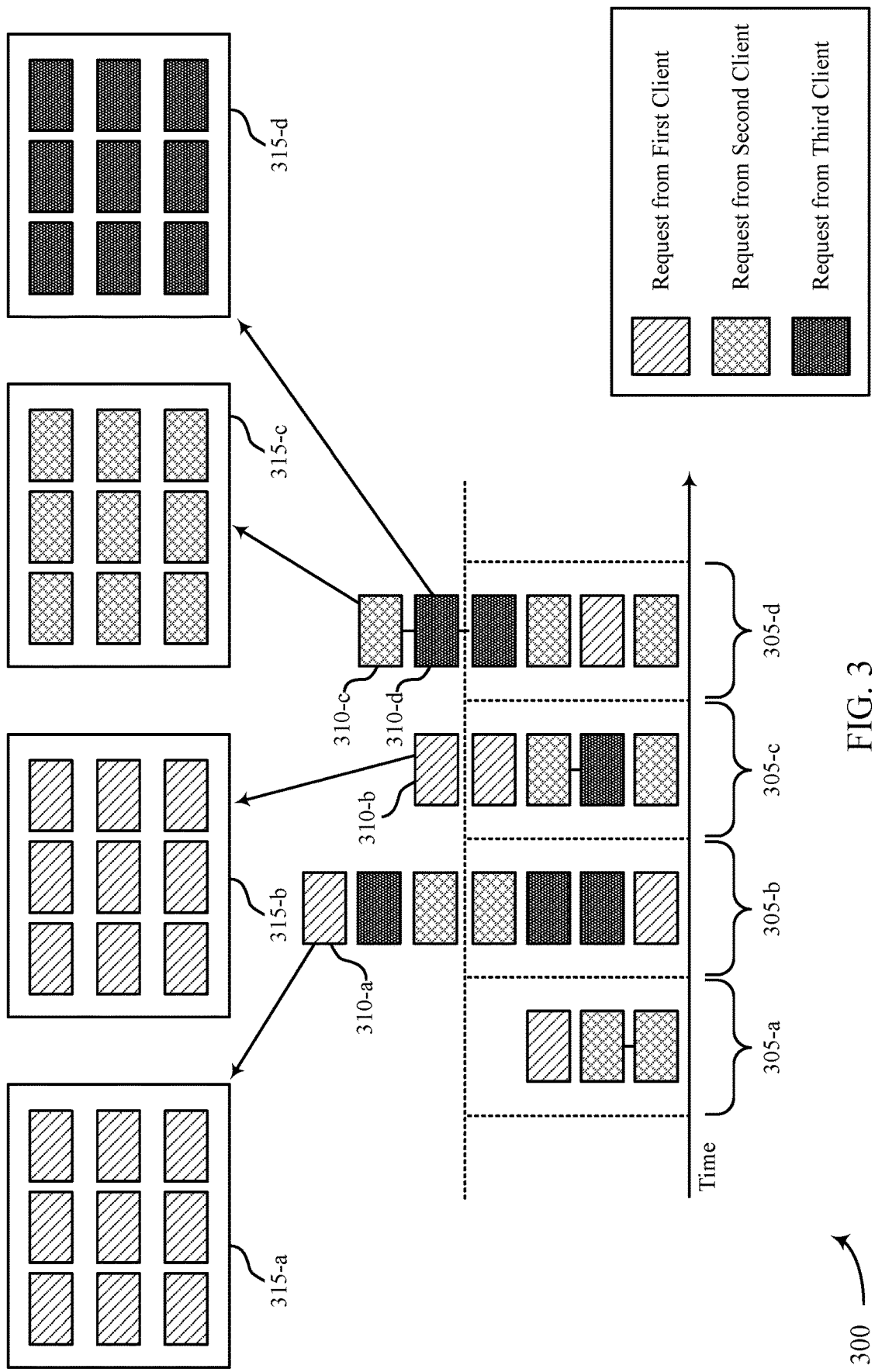
FIG. 3 illustrates an example of a request processing architecture that supports rate limit and burst limit enhancements for request processing in accordance with aspects of the present disclosure.

FIG. 3 illustrates an example of a request processing architecture 300 that supports rate limit and burst limit enhancements for request processing in accordance with aspects of the present disclosure. The request processing architecture 300 may implement or be implemented by aspects of the data processing system 100 or the data processing system 200. For example, the request processing architecture 300 may include requests 310, which may be examples of requests 210 described with reference to FIG. 2. The request processing architecture 300 may also include queues 315, which may be examples of queues 240 described with reference to FIG. 2. The request processing architecture 300 may enable an application server (e.g., the application server 230 described with reference to FIG. 2) to perform rate limit and burst limit control in an event-based environment (e.g., with or without an API gateway).

In the example of FIG. 3, the application server may receive a number of requests 310 from clients (e.g., cloud clients 105 described with reference to FIG. 1) via an open connection, which may be an example of a WebSocket-based connection or an event-based server-side connection, among other examples. In a time period 305-a (e.g., a first time window), the application server may receive one request from a first client and two requests from a second client. In a time period 305-b (e.g., a second time window), the application server may receive two requests from the first client, two requests from the second client, and three requests from a third client. In a time period 305-c (e.g., a third time window), the application server may receive two requests from the first client, two requests from the second client, and one request from the third client. In a time period 305-d (e.g., a fourth time window), the application server may receive one request from the first client, three requests from the second client, and two requests from the third client.

In some examples, the application server may be capable of processing all requests within a current time window. For example, the application server may be capable of processing all requests in the time period 305-a without exceeding any rate limit or burst limit constraints of the application server. In other examples, however, the application server may be unable to respond to all requests within a given time window (e.g., due to processing capabilities of the application server). For example, if the application server receives seven requests during the time period 305-b and the application server is capable of processing four requests during the time period 305-b, the application server may be unable to respond to three requests received in the time period 305-b. In some cloud computing systems, an API gateway may be configured to regulate the number of requests that the application server receives in a given time window and the number of requests that the application server processes in a given time window. In event-based environments, however, the application server may not have an API gateway to implement rate limit and burst limit controls.

Aspects of the present disclosure provide for using queues 315 and sliders (e.g., sequential groups of requests within a given queue) to perform rate limiting and burst limiting in an event-based environment. As an example, if the application server is unable to respond to a request 310-a from a first client during the time period 305-b, the application server may store the request 310-a in a queue 315-a corresponding to the first client. Similarly, the application server may store a request 310-c from a second client in a queue 315-c corresponding to the second client. Likewise, the application server may store a request 310-d from a third client in a queue 315-d corresponding to the third client.

In some examples, the application server may configure multiple queues 315 for the same client. Each queue may be specific to a priority level, a request type, or similar criteria. For example, the queue 315-a may store higher priority requests (e.g., requests with a first priority level, requests with priority levels that are above a threshold) from the first client, while a queue 315-b may store lower priority requests (e.g., requests with a second priority level, requests with priority levels below a threshold) from the first client. Thus, if the request 310-a from the first client is associated with a relatively higher priority level and a request 310-b from the first client is associated with a relatively lower priority level, the application server may store the request 310-a in the queue 315-a, and may store the request 310-b in the queue 315-b.

The request processing architecture 300 may enable an application server to perform rate limit control and burst limit control in an event-based environment (e.g., with or without an API gateway). For example, if an application server receives event-based requests from a set of clients via an open connection, the application server may use a first slider (e.g., a rate limit slider) and a second slider (e.g., a burst limit slider) to regulate how many requests 310 the application server receives from a client in each of the time periods 305 and how many requests 310 the application server processes in each of the time periods 305. Specifically, the application server may establish queues 315 for the set of clients, and may use various sliders to determine which requests 310 to pop (e.g., select) from the queues. Using queues in combination with sliders may enable the application server to respond to requests 310 from a larger number of clients, and may reduce a number of requests 310 dropped (e.g., not processed) by the application server, among other benefits.

Figure 4:
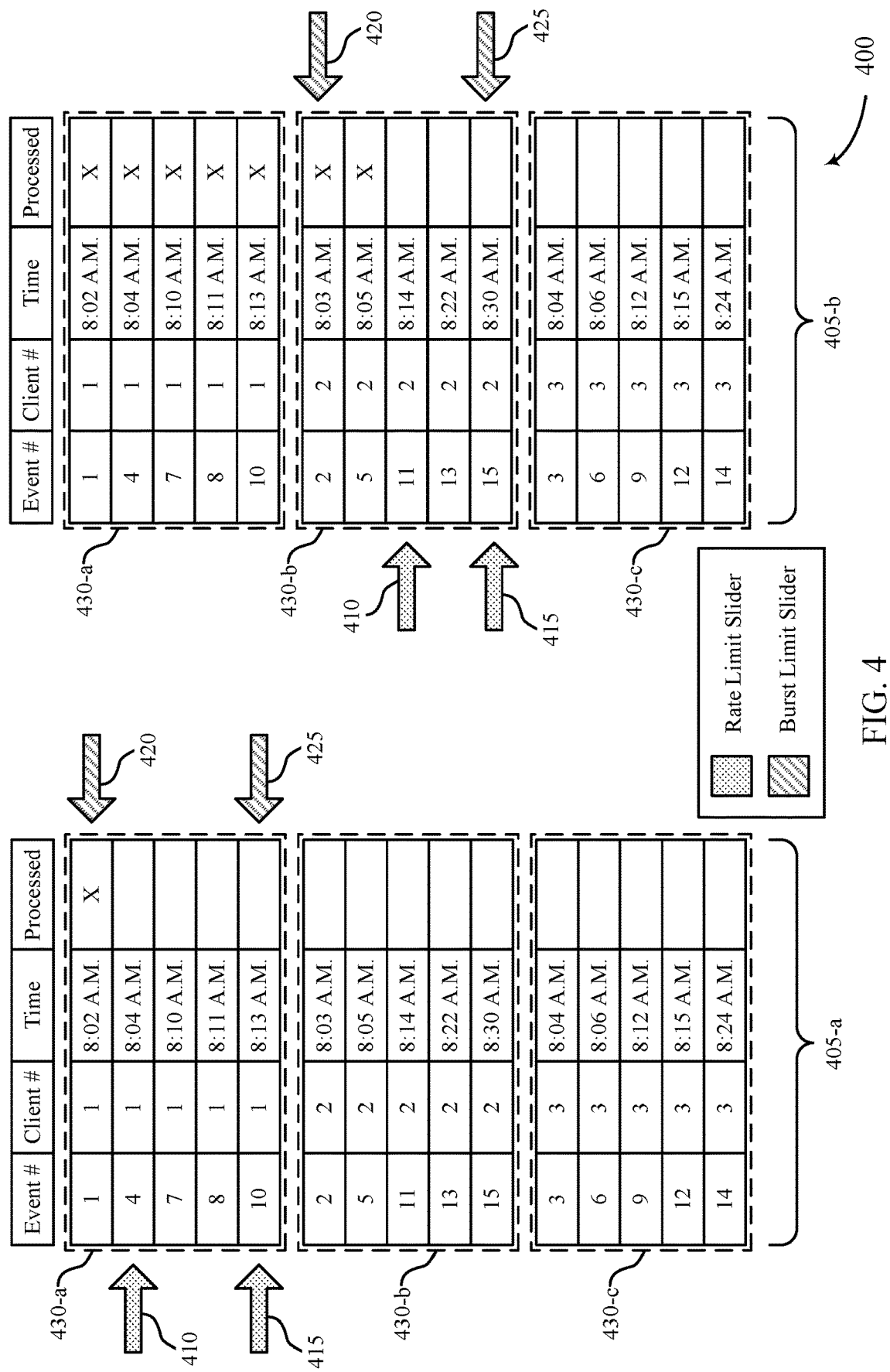
FIG. 4 illustrates an example of a queue management system that supports rate limit and burst limit enhancements for request processing in accordance with aspects of the present disclosure.

FIG. 4 illustrates an example of a queue management system 400 that supports rate limit and burst limit enhancements for request processing in accordance with aspects of the present disclosure. The queue management system 400 may implement or be implemented by aspects of the data processing system 100, the data processing system 200, the request processing architecture 300, or a combination thereof. For example, the queue management system 400 may include queues 430, which may be examples of queues 315 described with reference to FIG. 3. The queue management system 400 may enable an application server (e.g., an application server 230 described with reference to FIG. 2) to implement rate limit and burst limit control in an event-based cloud computing environment (e.g., with or without an API gateway).

In the example of FIG. 4, an application server may store requests from different clients (e.g., cloud clients 105 described with reference to FIG. 1) in queues 430. For example, the application server may store requests from a first client in a queue 430-*a*, and may store requests from a second client in a queue 430-*b*. Likewise, the application server may store requests from a third client in a queue 430-*c*. Each request may be processed as a different event at the application server. In some examples, the application server may record a timestamp for each request (e.g., an indication of a time at which the application server received the request). The application server may also append a flag to each request to indicate whether the request has been processed or not. At a first time 405-*a,* the application server may flag the first request in the queue 430-*a* (e.g., Event 1) as having been processed.

At a second time 405-*b,* the application server may flag all requests in the queue 430-*a* (e.g., Events 1, 4, 7, 8, and 10) and the first two requests in the queue 430-*b* (e.g., Events 2 and 5) as having been processed.

After storing requests in the queues 430, the application server may use a rate limit slider and a burst limit slider to select (e.g., pop) requests from the queues 430. The rate limit slider may be defined by a start pointer 410 and an end pointer 415, while the burst limit slider may be defined by a start pointer 420 and an end pointer 425. At the first time 405-*a*, the start pointer 410 of the rate limit slider may point to the second request in the queue 430-*a* (e.g., Event 4), and the end pointer 415 of the rate limit slider may point to the last request in the queue 430-*a* (e.g., Event 10). Similarly, the start pointer 420 of the burst limit slider may point to the first request in the queue 430-*a* (e.g., Event 1), and the end pointer 425 of the burst limit slider may point to the last request in the queue 430-*a* (e.g., Event 10). As such, the second request in the queue 430-*a* may be the first request in the rate limit slider, and the last request in the queue 430-*a* may be the last request in the rate limit slider. Likewise, the first request in the queue 430-*a* may be the first request in the burst limit slider, and the last request in the queue 430-*a* may be the last request in the burst limit slider. All requests between the start pointer 410 of the rate limit slider and the end pointer 415 of the burst limit slider (e.g., Events 4, 7, 8, and 10) may be within the rate limit slider, whereas all requests between the start pointer 420 of the burst limit slider and the end pointer 425 of the burst limit slider (e.g., Events 1, 4, 7, 8, and 10) may be within the burst limit slider. Requests that are present in both the rate limit slider and the burst limit slider (e.g., Events 4, 7, 8, and 10) may be eligible (e.g., valid) for processing.

As described herein, the application server may select requests that have passed through the rate limit slider and are present in the burst limit slider (e.g., requests that are eligible for processing). The selected requests may be processed by the application server or a set of data processing servers connected to the application server. After selecting (e.g., popping) requests from the queues 430, the application server may increment one or both of the burst limit slider or the rate limit slider. Specifically, the application server may move the rate limit slider if a time difference between a first request in the rate limit slider (e.g., Event 4) and a last request in the rate limit slider (e.g., Event 10) is below a threshold. The application server may move the burst limit slider after a fixed time interval if all requests in the burst limit slider have been processed.

At the second time 405-*b,* the application server may increment the burst limit slider because all requests that were previously present in the burst limit slider (e.g., Events 1, 4, 7, 8 and 10) have been processed. As such, the start pointer 420 of the burst limit slider may point to the first request in the queue 430-*b* (e.g., Event 2), and the end pointer 425 of the burst limit slider may point to the last request in the queue 430-*b* (e.g., Event 15). Thus, all requests in the queue 430-*b* (e.g., Events 2, 5, 11, 13, and 15) may be within the burst limit slider at the second time 405-*b.* The application server may increment the rate limit slider if, for example, a time difference between the first request in the rate limit slider and the last request in the rate limit slider at the first time 405-*a* is below a threshold. Thus, at the second time 405-*b,* the start pointer 410 of the rate limit slider may point to the third request in the queue 430-*b* (e.g., Event 11), and the end pointer 415 of the rate limit slider may point to the last request in the queue 430-*b* (e.g., Event 15). All requests between these pointers (e.g., Events 11, 13, and 15) may be within the rate limit slider. All requests that are present in both the rate limit slider and the burst limit slider at the second time 405-*b* (e.g., Events 11, 13, and 15) may be eligible for processing.

The queue management system 400 may enable an application server to perform rate limit control and burst limit control in an event-based environment (e.g., with or without an API gateway). For example, if an application server receives event-based requests from clients via an open connection, the application server may use a rate limit slider and a burst limit slider to regulate how many requests the application server receives from a client in a given time period and how many requests the application server processes in a given time period. Specifically, the application server may establish queues 430 to store requests from different clients, and may use various sliders to determine which requests to pop (e.g., select) from the queues 430. Using the queues 430 in combination with sliders may enable the application server to respond to requests from a larger number of clients, and may reduce a number of requests dropped (e.g., not processed) by the application server, among other benefits.

Figure 5:
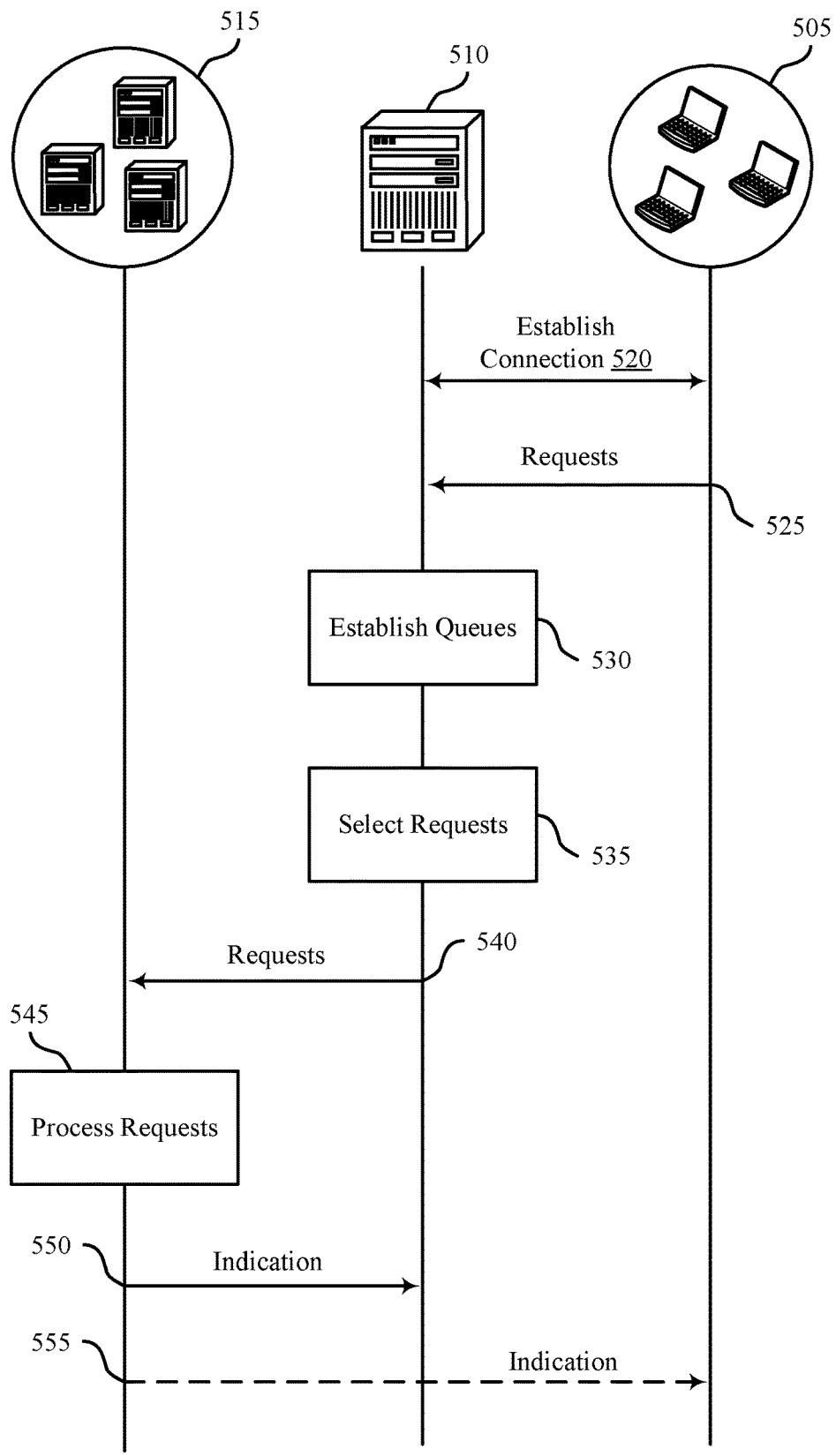
FIG. 5 illustrates an example of a process flow that supports rate limit and burst limit enhancements for request processing in accordance with aspects of the present disclosure.

FIG. 5 illustrates an example of a process flow 500 that supports rate limit and burst limit enhancements for request processing in accordance with aspects of the present disclosure. The process flow 500 may implement or be implemented by aspects of the data processing system 100, the data processing system 200, the request processing architecture 300, or the queue management system 400. For example, the process flow 500 may include a set of clients 505, an application server 510, and a set of data processing servers 515, which may be examples of corresponding devices described with reference to FIGS. 1 through 4. In the process flow 500, the application server 510 may receive and process event-based requests from the set of clients 505 via an open connection.

At 520, the application server 510 may establish an open connection with the set of clients 505 such that the set of clients 505 can transmit requests to the application server 510 via the open connection. As described herein, the open connection may be an example of a WebSocket connection or an event-based server-side connection. Establishing an open connection with the set of clients 505 may enable the application server 510 to block a single thread for each client, as opposed to blocking a thread for each request. As a result, the application server 510 may process requests from a larger number of clients, even if the application server 510 receives a large number of requests from a single client within a short time interval.

At 525, the application server 510 may receive a number of requests from the set of clients 505. For example, the application server 510 may receive a first set of requests from a first client, a second set of requests from a second client, a third set of requests from a third client, or a combination thereof. These requests may include higher-priority requests, lower-priority requests, requests to modify customer records, or requests for data stored at the application server (or another cloud server), among other examples. In some examples, the set of clients 505 may transmit these requests at different times. In other examples, the application server 510 may receive a large number of requests from the set of clients 505 within a given time period.

At 530, the application server 510 may establish a set of queues for at least one client from the set of clients 505. In some examples, the application server 510 may establish multiple queues for each client in the set of clients 505, where each queue corresponds to a different priority level or request type. For example, the application server 510 may establish a first queue for storing higher-priority requests from the first client and a second queue for storing lower-priority requests from the first client. Each queue may be configured with a maximum size that depends on processing capabilities of the application server 510 and a number of clients served by the application server.

At 535, the application server 510 may select (e.g., pop) one or more requests from the set of queues based on a rate limit capability of the application server and a burst limit capability of the application server. As described herein, the rate limit capability may refer to a total number of requests that the application server 510 can process in a given time period, and the burst limit capability may refer to a maximum number of requests that the application server 510 is capable of receiving from a single client within a given time period.

The application server 510 may use a first slider (e.g., a rate limit slider) and a second slider (e.g., a burst limit slider) to determine which requests to select from the set of queues. As described herein, a slider may refer to a sequential group of requests within a given queue that are defined by a start pointer (e.g., a pointer to a first request in a slider) and an end pointer (e.g., a pointer to a last request in a slider). The application server 510 may select requests from a given queue if the requests are present in both the first slider and the second slider. The application server 510 may adjust the first slider (e.g., by incrementing the start pointer and the end pointer of the first slider) if a time difference between a first request in the first slider and a last request in the first slider is below a specified threshold. The application server 510 may adjust the second slider after a fixed time period if all requests in the second slider have been processed.

At 540, the application server 510 may process the requests or send the requests to the set of data processing servers 515 (e.g., cloud servers connected to the application server 510). If, for example, the application server 510 is idle (e.g., processing fewer requests than the application server 510 can handle), the application server 510 may process the requests in a current time window rather than sending the requests to the set of data processing servers 515 or processing the requests in a subsequent time window. Alternatively, if the application server 510 is unable to process all of the requests, the application server 510 may transmit some or all of the requests to the data processing servers 515 such that the data processing servers 515 can handle the requests.

If, for example, the application server 510 transmits some or all of the requests to the data processing servers 515, the data processing servers 515 may process the requests at 545. At 550, the data processing servers 515 may notify the application server 510 when the requests have been successfully processed. Upon receiving this notification, the application server 510 may respond to the set of clients 505 at 555 (e.g., via the open connection). In some examples, both the requests from the set of clients 505 and the responses from the application server 510 may be treated as different events at the application server.

The process flow 500 may enable the application server 510 to perform rate limit control and burst limit control in an event-based environment (e.g., with or without an API gateway). For example, if the application server 510 receives event-based requests from the set of clients 505 via an open connection, the application server 510 may use a first slider (e.g., a rate limit slider) and a second slider (e.g., a burst control slider) to regulate how many requests the application server 510 receives from a client in a given time period and how many requests the application server 510 processes in a given time period. Specifically, the application server 510 may establish queues for the set of clients 505, and may use the first slider and the second slider to determine which requests to pop (e.g., select) from the queues. Using queues in combination with sliders may enable the application server 510 to respond to requests from a larger number of clients, and may reduce a number of requests dropped (e.g., not processed) by the application server 510, among other benefits.

Figure 6:
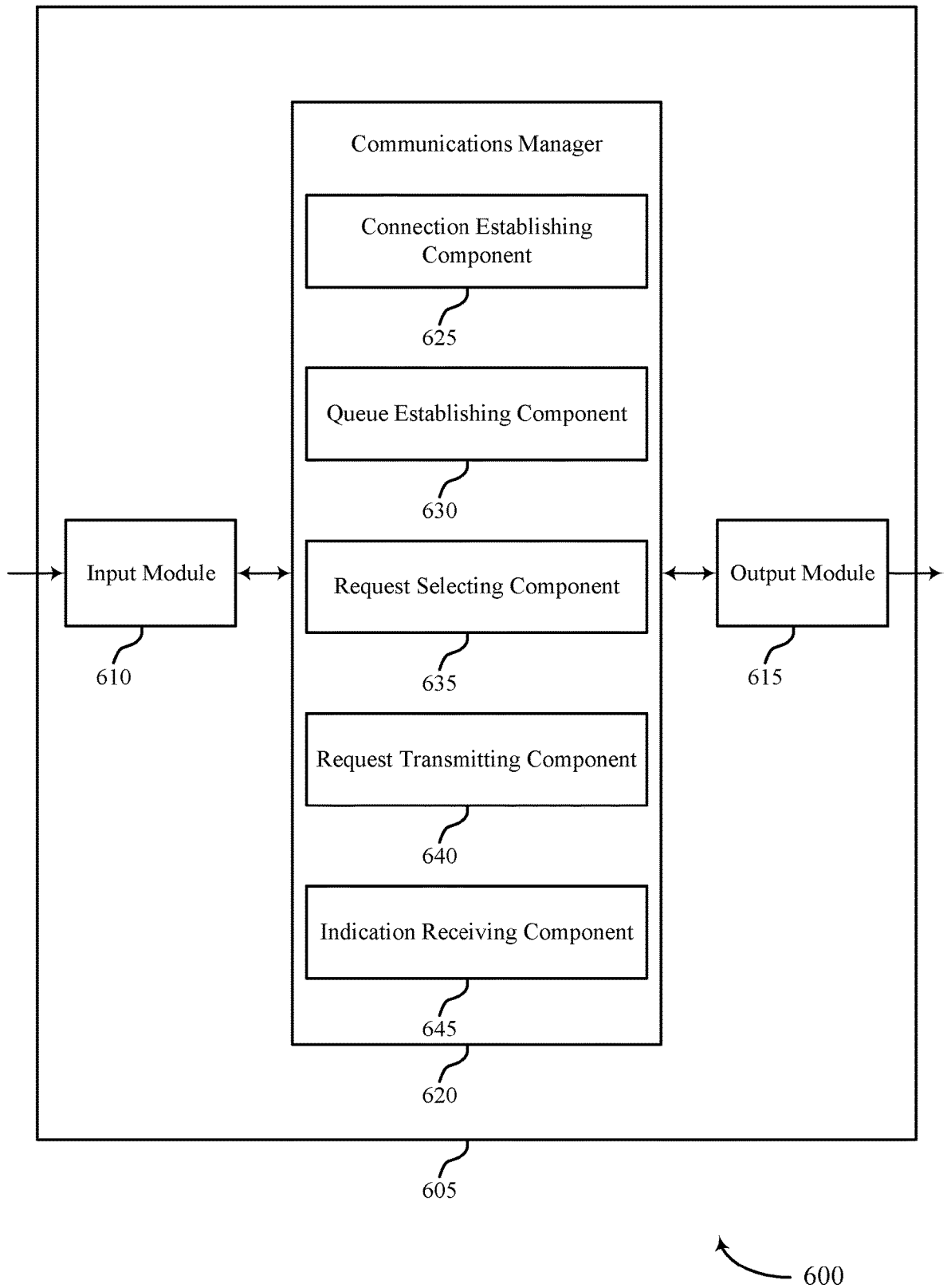
FIG. 6 shows a block diagram of an apparatus that supports rate limit and burst limit enhancements for request processing in accordance with aspects of the present disclosure.

FIG. 6 shows a block diagram 600 of a device 605 that supports rate limit and burst limit enhancements for request processing in accordance with aspects of the present disclosure. The device 605 may include an input module 610, an output module 615, and a communications manager 620. The device 605 may also include a processor. Each of these components may be in communication with one another (e.g., via one or more buses).

The input module 610 may manage input signals for the device 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the device 605 for processing. For example, the input module 610 may transmit input signals to the communications manager 620 to support rate limit and burst limit enhancements for request processing. In some cases, the input module 610 may be a component of an I/O controller 810 as described with reference to FIG. 8.

The output module 615 may manage output signals for the device 605. For example, the output module 615 may receive signals from other components of the device 605, such as the communications manager 620, and may transmit these signals to other components or devices. In some examples, the output module 615 may transmit output signals for display in a user interface, for storage in a database or data store, for further processing at a server or server cluster, or for any other processes at any number of devices or systems. In some cases, the output module 615 may be a component of an I/O controller 810 as described with reference to FIG. 8.

For example, the communications manager 620 may include a connection establishing component 625, a queue establishing component 630, a request selecting component 635, a request transmitting component 640, an indication receiving component 645, or any combination thereof. In some examples, the communications manager 620, or various components thereof, may be configured to perform various operations (e.g., receiving, monitoring, transmitting) using or otherwise in cooperation with the input module 610, the output module 615, or both. For example, the communications manager 620 may receive information from the input module 610, send information to the output module 615, or be integrated in combination with the input module 610, the output module 615, or both to receive information, transmit information, or perform various other operations as described herein.

The communications manager 620 may support data processing at an application server in accordance with examples as disclosed herein. The connection establishing component 625 may be configured as or otherwise support a means for establishing an open connection for responding to multiple requests from multiple clients supported by the application server, the open connection remaining active until the multiple requests have been processed. The queue establishing component 630 may be configured as or otherwise support a means for establishing, for at least one client of the multiple clients, a set of queues configured for storing requests received from the at least one client via the open connection. The request selecting component 635 may be configured as or otherwise support a means for selecting one or more requests from the set of queues based on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration. The request transmitting component 640 may be configured as or otherwise support a means for transmitting the one or more requests to a set of data processing servers connected to the application server. The indication receiving component 645 may be configured as or otherwise support a means for receiving, from the set of data processing servers, an indication that the one or more requests have been processed.

Figure 7:
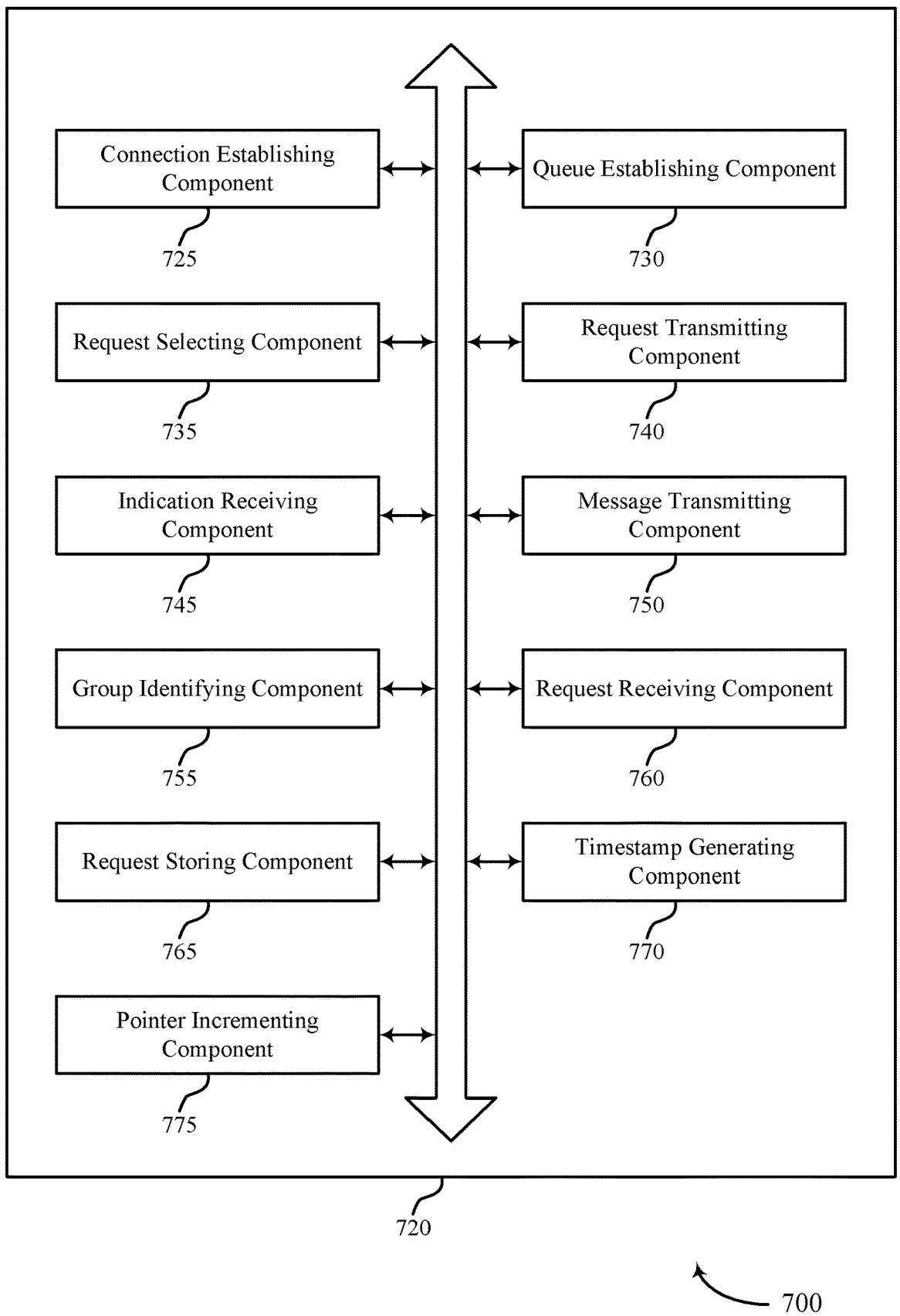
FIG. 7 shows a block diagram of a communications manager that supports rate limit and burst limit enhancements for request processing in accordance with aspects of the present disclosure.

FIG. 7 shows a block diagram 700 of a communications manager 720 that supports rate limit and burst limit enhancements for request processing in accordance with aspects of the present disclosure. The communications manager 720 may be an example of aspects of a communications manager or a communications manager 620, or both, as described herein. The communications manager 720, or various components thereof, may be an example of means for performing various aspects of rate limit and burst limit enhancements for request processing as described herein. For example, the communications manager 720 may include a connection establishing component 725, a queue establishing component 730, a request selecting component 735, a request transmitting component 740, an indication receiving component 745, a message transmitting component 750, a group identifying component 755, a request receiving component 760, a request storing component 765, a timestamp generating component 770, a pointer incrementing component 775, or any combination thereof. Each of these components may communicate, directly or indirectly, with one another (e.g., via one or more buses).

The communications manager 720 may support data processing at an application server in accordance with examples as disclosed herein. The connection establishing component 725 may be configured as or otherwise support a means for establishing an open connection for responding to multiple requests from multiple clients supported by the application server, the open connection remaining active until the multiple requests have been processed. The queue establishing component 730 may be configured as or otherwise support a means for establishing, for at least one client of the multiple clients, a set of queues configured for storing requests received from the at least one client via the open connection. The request selecting component 735 may be configured as or otherwise support a means for selecting one or more requests from the set of queues based on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration. The request transmitting component 740 may be configured as or otherwise support a means for transmitting the one or more requests to a set of data processing servers connected to the application server. The indication receiving component 745 may be configured as or otherwise support a means for receiving, from the set of data processing servers, an indication that the one or more requests have been processed.

In some examples, the message transmitting component 750 may be configured as or otherwise support a means for transmitting, to the at least one client and based on receiving the indication from the set of data processing servers, a message indicating that the one or more requests have been processed.

In some examples, the group identifying component 755 may be configured as or otherwise support a means for identifying a first sequential group of requests from the set of queues and a second sequential group of requests from the set of queues, where selecting the one or more requests is based on identifying the first sequential group of requests and the second sequential group of requests.

In some examples, the first sequential group of requests is associated with a first start pointer and a first end pointer, the first start pointer corresponding to a first request in the first sequential group of requests, the first end pointer corresponding to a last request in the first sequential group of requests. In some examples, the second sequential group of requests is associated with a second start pointer and a second end pointer, the second start pointer corresponding to a first request in the second sequential group of requests, the second end pointer corresponding to a last request in the second sequential group of requests.

In some examples, the pointer incrementing component 775 may be configured as or otherwise support a means for incrementing the first start pointer and the first end pointer based on a time difference between the first request in the first sequential group of requests and the last request in the first sequential group of requests.

In some examples, the pointer incrementing component 775 may be configured as or otherwise support a means for incrementing the second start pointer and the second end pointer when the second sequential group of requests is empty and a predefined amount of time has elapsed.

In some examples, to support selecting the one or more requests, the request selecting component 735 may be configured as or otherwise support a means for selecting the one or more requests from the set of queues based on the first sequential group of requests and the second sequential group of requests including the one or more requests.

In some examples, one or both of the first sequential group of requests or the second sequential group of requests is associated with a constant length. In some examples, the first sequential group of requests is used for rate limit control and the second sequential group of requests is used for burst limit control.

In some examples, the request receiving component 760 may be configured as or otherwise support a means for receiving the one or more requests from the at least one client during a first time period. In some examples, the request storing component 765 may be configured as or otherwise support a means for storing the one or more requests in the set of queues. In some examples, the request selecting component 735 may be configured as or otherwise support a means for selecting the one or more requests from the set of queues during a second time period that is subsequent to the first time period.

In some examples, the one or more requests include one or more respective fields indicating whether the one or more requests have been processed. In some examples, the set of queues is associated with a size that is based on a processing capability of the application server, a quantity of clients supported by the application server, or both.

In some examples, the timestamp generating component 770 may be configured as or otherwise support a means for generating multiple timestamps for the multiple requests based on receiving the multiple requests from the multiple clients via the open connection, where selecting the one or more requests from the set of queues is based on the multiple timestamps.

In some examples, to support selecting the one or more requests, the request selecting component 735 may be configured as or otherwise support a means for selecting the one or more requests from the set of queues based on priority levels associated with the one or more requests.

In some examples, a first queue from the set of queues is configured to store requests associated with a first priority level. In some examples, a second queue from the set of queues is configured to store requests associated with a second priority level that is different from the first priority level. In some examples, the open connection includes a WebSocket-based connection or a server-side event-based connection.

Figure 8:
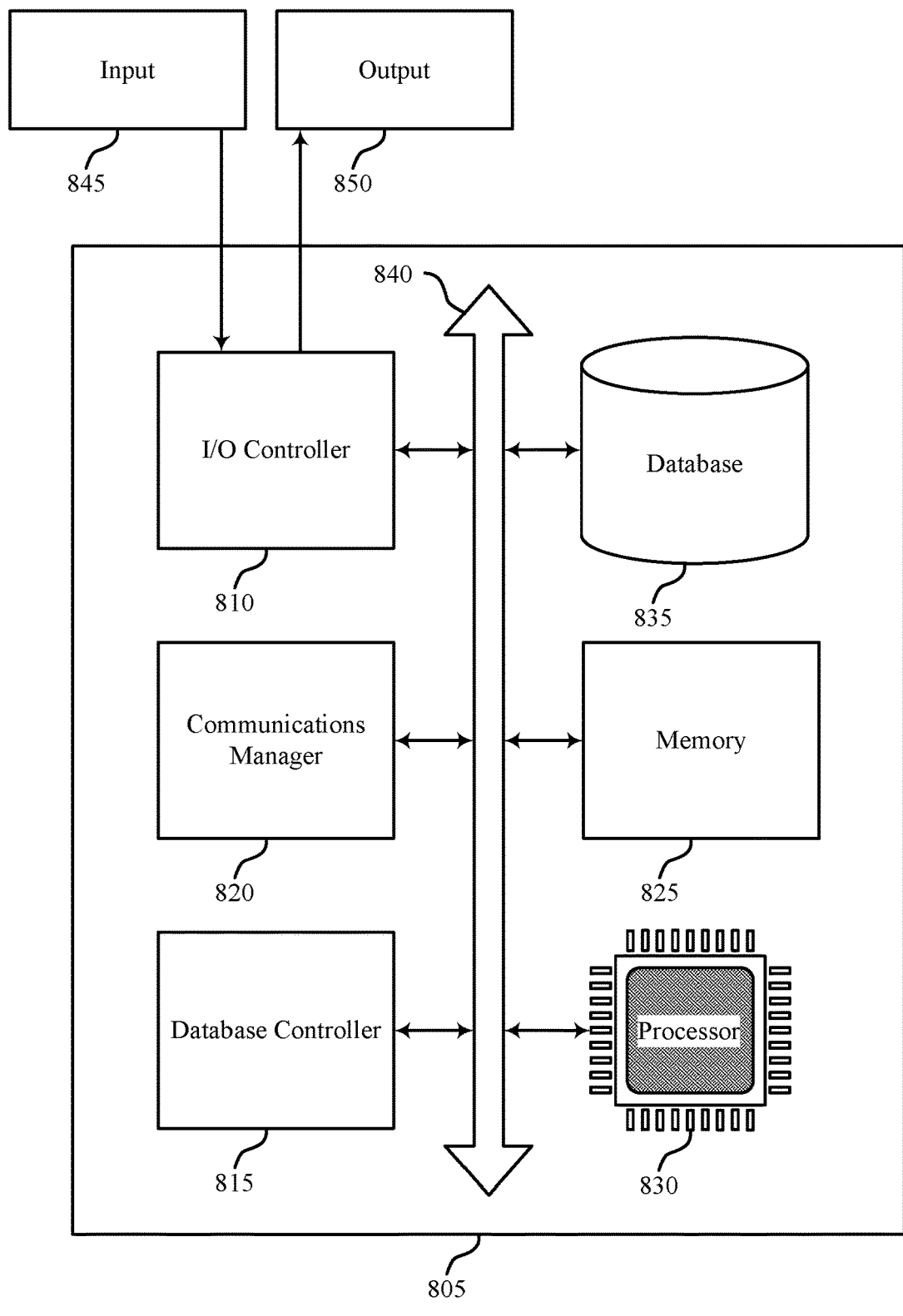
FIG. 8 shows a diagram of a system including a device that supports rate limit and burst limit enhancements for request processing in accordance with aspects of the present disclosure.

FIG. 8 shows a diagram of a system 800 including a device 805 that supports rate limit and burst limit enhancements for request processing in accordance with aspects of the present disclosure. The device 805 may be an example of or include the components of a device 605 as described herein. The device 805 may include components for bi-directional data communications including components for transmitting and receiving communications, such as a communications manager 820, an I/O controller 810, a database controller 815, a memory 825, a processor 830, and a database 835. These components may be in electronic communication or otherwise coupled (e.g., operatively, communicatively, functionally, electronically, electrically) via one or more buses (e.g., a bus 840).

The I/O controller 810 may manage input signals 845 and output signals 850 for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. In other cases, the I/O controller 810 may represent or interact with a modem, a keyboard, a mouse, a touchscreen, or a similar device. In some cases, the I/O controller 810 may be implemented as part of a processor 830. In some examples, a user may interact with the device 805 via the I/O controller 810 or via hardware components controlled by the I/O controller 810.

The database controller 815 may manage data storage and processing in a database 835. In some cases, a user may interact with the database controller 815. In other cases, the database controller 815 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor 830 to perform various functions described herein. In some cases, the memory 825 may contain, among other things, a basic I/O system (BIOS), which may control basic hardware or software operation such as the interaction with peripheral components or devices.

The processor 830 may include an intelligent hardware device, (e.g., a general-purpose processor, a digital signal processor (DSP), a central processing unit (CPU), a microcontroller, an application-specific integrated circuit (ASIC), a field-programmable gate array (FPGA), a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting rate limit and burst limit enhancements for request processing).

The communications manager 820 may support data processing at an application server in accordance with examples as disclosed herein. For example, the communications manager 820 may be configured as or otherwise support a means for establishing an open connection for responding to multiple requests from multiple clients supported by the application server, the open connection remaining active until the multiple requests have been processed. The communications manager 820 may be configured as or otherwise support a means for establishing, for at least one client of the multiple clients, a set of queues configured for storing requests received from the at least one client via the open connection. The communications manager 820 may be configured as or otherwise support a means for selecting one or more requests from the set of queues based on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration. The communications manager 820 may be configured as or otherwise support a means for transmitting the one or more requests to a set of data processing servers connected to the application server. The communications manager 820 may be configured as or otherwise support a means for receiving, from the set of data processing servers, an indication that the one or more requests have been processed.

By including or configuring the communications manager 820 in accordance with examples as described herein, the device 805 may support techniques for improved data processing at an application server. For example, the techniques described herein may enable an application server to store requests in a set of queues when a rate limit or a burst limit of the application server has been exceeded. As such, if the application server is unable to process all requests received within a given time period, the application server may store some of these requests in a queue such that the requests can be processed at a later time. Configuring the application server to store requests in queues may reduce a number of requests that are dropped (e.g., not processed) by the application server, which may result in greater processing efficiency at the application server.

Figure 9:
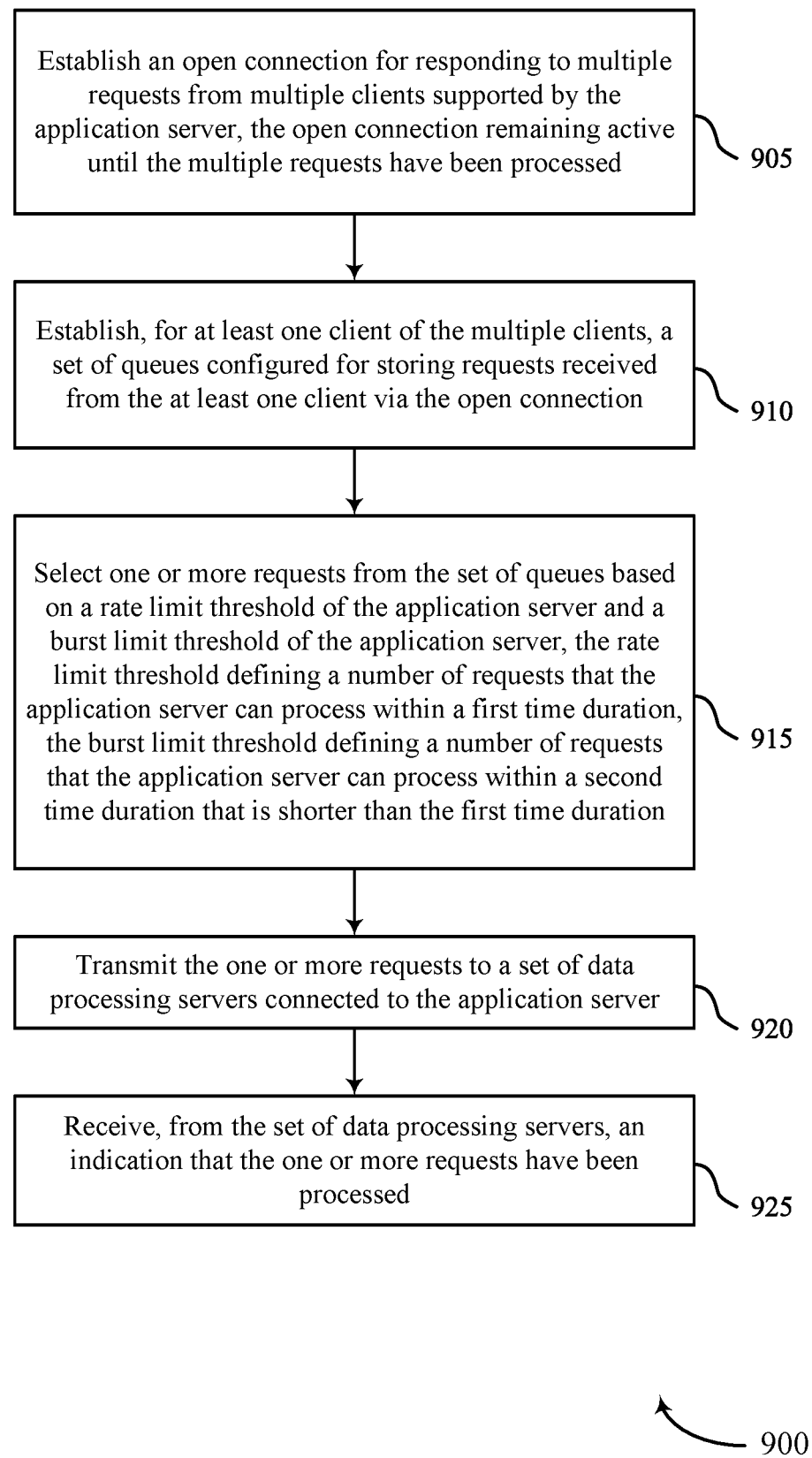
FIGS. 9 through 12 show flowcharts illustrating methods that support rate limit and burst limit enhancements for request processing in accordance with aspects of the present disclosure.

FIG. 9 shows a flowchart illustrating a method 900 that supports rate limit and burst limit enhancements for request processing in accordance with aspects of the present disclosure. The operations of the method 900 may be implemented by an application server or its components as described herein. For example, the operations of the method 900 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 905, the method may include establishing an open connection for responding to multiple requests from multiple clients supported by the application server, the open connection remaining active until the multiple requests have been processed. The operations of 905 may be performed in accordance with examples as disclosed herein. In some examples, aspects of the operations of 905 may be performed by a connection establishing component 725 as described with reference to FIG. 7.

At 910, the method may include establishing, for at least one client of the multiple clients, a set of queues configured for storing requests received from the at least one client via the open connection. The operations of 910 may be performed in accordance with examples as disclosed herein. In some examples, aspects of the operations of 910 may be performed by a queue establishing component 730 as described with reference to FIG. 7.

At 915, the method may include selecting one or more requests from the set of queues based on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration. The operations of 915 may be performed in accordance with examples as disclosed herein. In some examples, aspects of the operations of 915 may be performed by a request selecting component 735 as described with reference to FIG. 7.

At 920, the method may include transmitting the one or more requests to a set of data processing servers connected to the application server. The operations of 920 may be performed in accordance with examples as disclosed herein. In some examples, aspects of the operations of 920 may be performed by a request transmitting component 740 as described with reference to FIG. 7.

At 925, the method may include receiving, from the set of data processing servers, an indication that the one or more requests have been processed. The operations of 925 may be performed in accordance with examples as disclosed herein. In some examples, aspects of the operations of 925 may be performed by an indication receiving component 745 as described with reference to FIG. 7.

Figure 10:
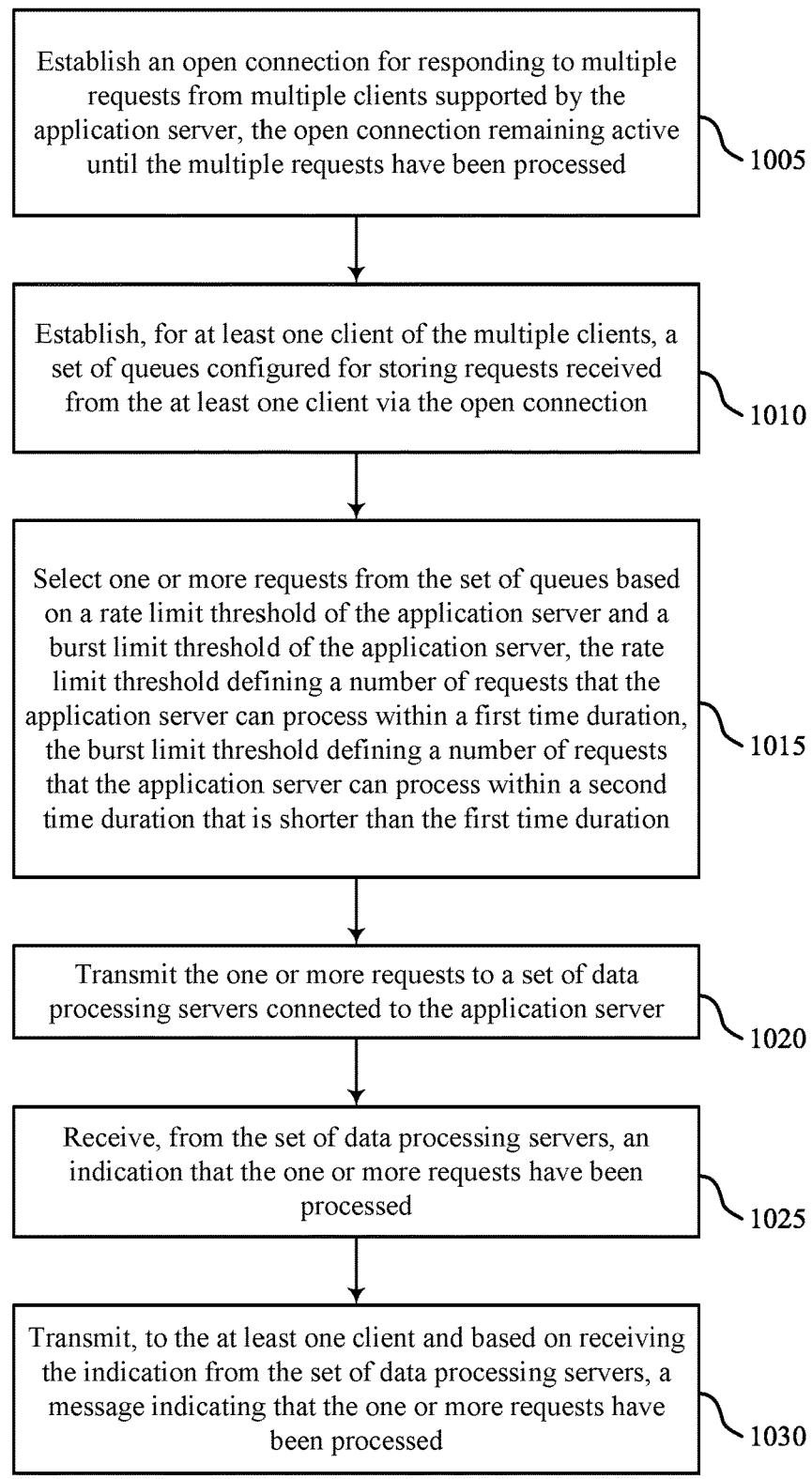

FIG. 10 shows a flowchart illustrating a method 1000 that supports rate limit and burst limit enhancements for request processing in accordance with aspects of the present disclosure. The operations of the method 1000 may be implemented by an application server or its components as described herein. For example, the operations of the method 1000 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1005, the method may include establishing an open connection for responding to multiple requests from multiple clients supported by the application server, the open connection remaining active until the multiple requests have been processed. The operations of 1005 may be performed in accordance with examples as disclosed herein. In some examples, aspects of the operations of 1005 may be performed by a connection establishing component 725 as described with reference to FIG. 7.

At 1010, the method may include establishing, for at least one client of the multiple clients, a set of queues configured for storing requests received from the at least one client via the open connection. The operations of 1010 may be performed in accordance with examples as disclosed herein. In some examples, aspects of the operations of 1010 may be performed by a queue establishing component 730 as described with reference to FIG. 7.

At 1015, the method may include selecting one or more requests from the set of queues based on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration. The operations of 1015 may be performed in accordance with examples as disclosed herein. In some examples, aspects of the operations of 1015 may be performed by a request selecting component 735 as described with reference to FIG. 7.

At 1020, the method may include transmitting the one or more requests to a set of data processing servers connected to the application server. The operations of 1020 may be performed in accordance with examples as disclosed herein. In some examples, aspects of the operations of 1020 may be performed by a request transmitting component 740 as described with reference to FIG. 7.

At 1025, the method may include receiving, from the set of data processing servers, an indication that the one or more requests have been processed. The operations of 1025 may be performed in accordance with examples as disclosed herein. In some examples, aspects of the operations of 1025 may be performed by an indication receiving component 745 as described with reference to FIG. 7.

At 1030, the method may include transmitting, to the at least one client and based on receiving the indication from the set of data processing servers, a message indicating that the one or more requests have been processed. The operations of 1030 may be performed in accordance with examples as disclosed herein. In some examples, aspects of the operations of 1030 may be performed by a message transmitting component 750 as described with reference to FIG. 7.

Figure 11:
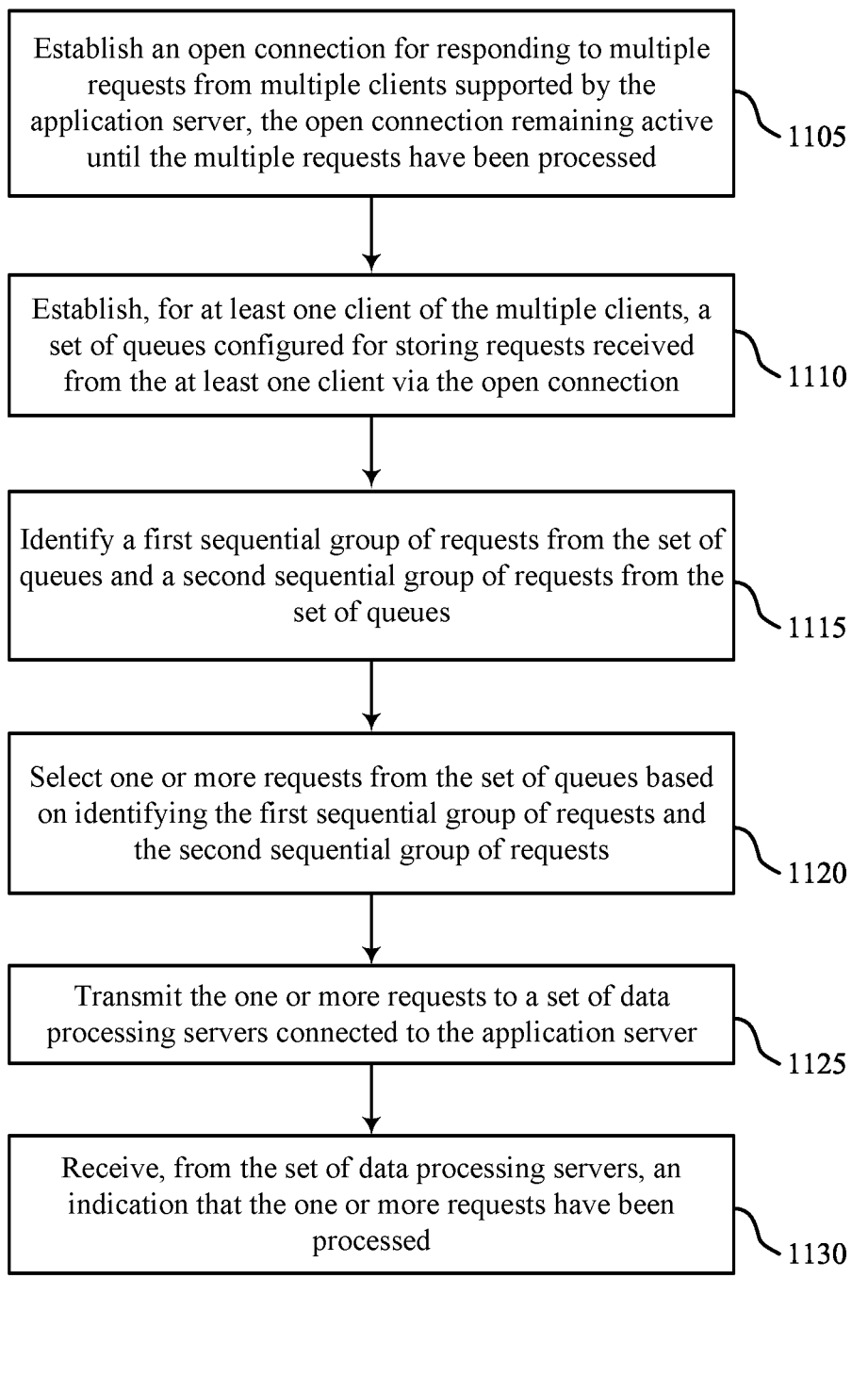

FIG. 11 shows a flowchart illustrating a method 1100 that supports rate limit and burst limit enhancements for request processing in accordance with aspects of the present disclosure. The operations of the method 1100 may be implemented by an application server or its components as described herein. For example, the operations of the method 1100 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1105, the method may include establishing an open connection for responding to multiple requests from multiple clients supported by the application server, the open connection remaining active until the multiple requests have been processed. The operations of 1105 may be performed in accordance with examples as disclosed herein. In some examples, aspects of the operations of 1105 may be performed by a connection establishing component 725 as described with reference to FIG. 7.

At 1110, the method may include establishing, for at least one client of the multiple clients, a set of queues configured for storing requests received from the at least one client via the open connection. The operations of 1110 may be performed in accordance with examples as disclosed herein. In some examples, aspects of the operations of 1110 may be performed by a queue establishing component 730 as described with reference to FIG. 7.

At 1115, the method may include identifying a first sequential group of requests from the set of queues and a second sequential group of requests from the set of queues. The operations of 1115 may be performed in accordance with examples as disclosed herein. In some examples, aspects of the operations of 1115 may be performed by a group identifying component 755 as described with reference to FIG. 7.

At 1120, the method may include selecting one or more requests from the set of queues based on identifying the first sequential group of requests and the second sequential group of requests. The operations of 1120 may be performed in accordance with examples as disclosed herein. In some examples, aspects of the operations of 1120 may be performed by a request selecting component 735 as described with reference to FIG. 7.

At 1125, the method may include transmitting the one or more requests to a set of data processing servers connected to the application server. The operations of 1125 may be performed in accordance with examples as disclosed herein. In some examples, aspects of the operations of 1125 may be performed by a request transmitting component 740 as described with reference to FIG. 7.

At 1130, the method may include receiving, from the set of data processing servers, an indication that the one or more requests have been processed. The operations of 1130 may be performed in accordance with examples as disclosed herein. In some examples, aspects of the operations of 1130 may be performed by an indication receiving component 745 as described with reference to FIG. 7.

Figure 12:
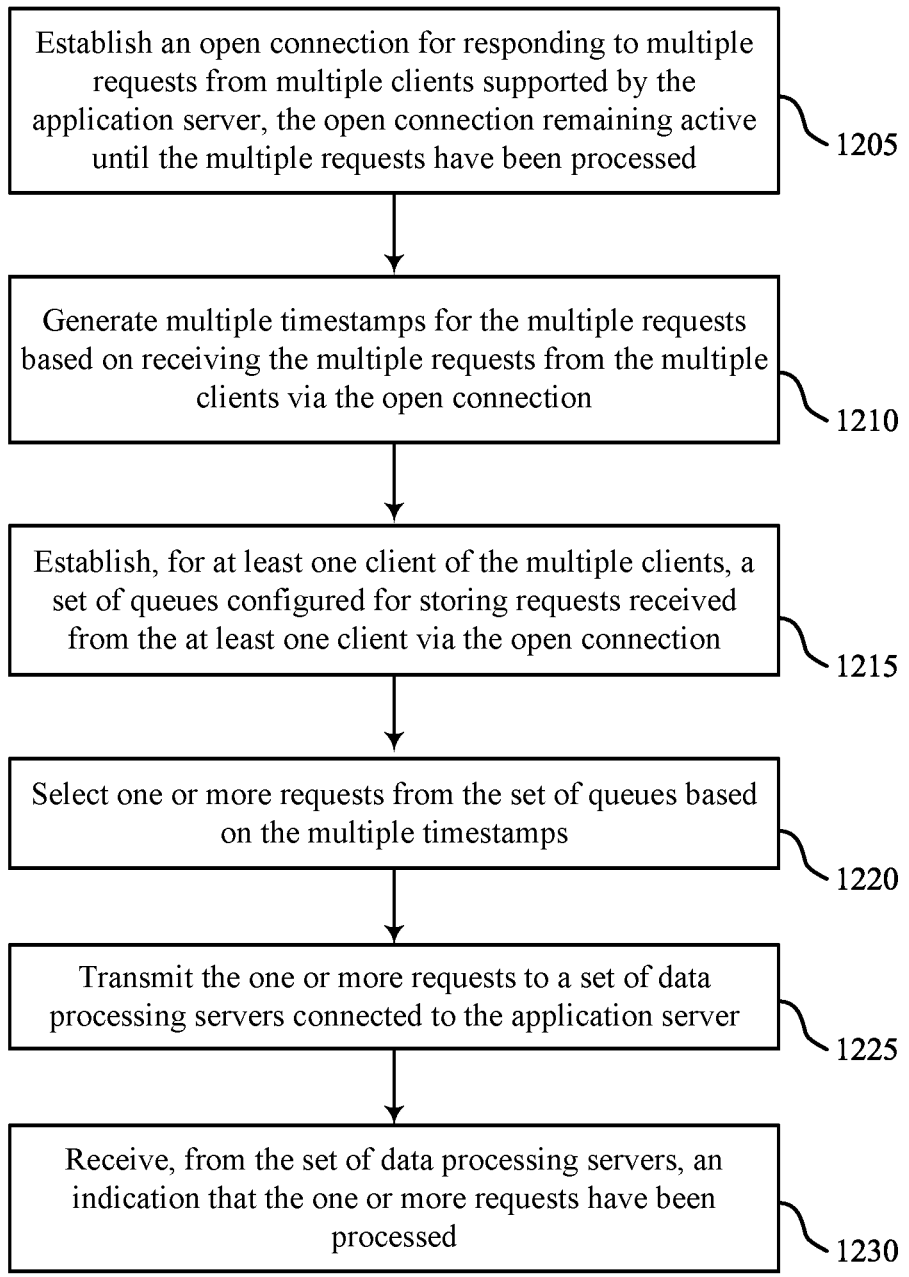

FIG. 12 shows a flowchart illustrating a method 1200 that supports rate limit and burst limit enhancements for request processing in accordance with aspects of the present disclosure. The operations of the method 1200 may be implemented by an application server or its components as described herein. For example, the operations of the method 1200 may be performed by an application server as described with reference to FIGS. 1 through 8. In some examples, an application server may execute a set of instructions to control the functional elements of the application server to perform the described functions. Additionally or alternatively, the application server may perform aspects of the described functions using special-purpose hardware.

At 1205, the method may include establishing an open connection for responding to multiple requests from multiple clients supported by the application server, the open connection remaining active until the multiple requests have been processed. The operations of 1205 may be performed in accordance with examples as disclosed herein. In some examples, aspects of the operations of 1205 may be performed by a connection establishing component 725 as described with reference to FIG. 7.

At 1210, the method may include generating multiple timestamps for the multiple requests based on receiving the multiple requests from the multiple clients via the open connection. The operations of 1210 may be performed in accordance with examples as disclosed herein. In some examples, aspects of the operations of 1210 may be performed by a timestamp generating component 770 as described with reference to FIG. 7.

At 1215, the method may include establishing, for at least one client of the multiple clients, a set of queues configured for storing requests received from the at least one client via the open connection. The operations of 1215 may be performed in accordance with examples as disclosed herein. In some examples, aspects of the operations of 1215 may be performed by a queue establishing component 730 as described with reference to FIG. 7.

At 1220, the method may include selecting one or more requests from the set of queues based on the multiple timestamps. The operations of 1220 may be performed in accordance with examples as disclosed herein. In some examples, aspects of the operations of 1220 may be performed by a request selecting component 735 as described with reference to FIG. 7.

At 1225, the method may include transmitting the one or more requests to a set of data processing servers connected to the application server. The operations of 1225 may be performed in accordance with examples as disclosed herein. In some examples, aspects of the operations of 1225 may be performed by a request transmitting component 740 as described with reference to FIG. 7.

At 1230, the method may include receiving, from the set of data processing servers, an indication that the one or more requests have been processed. The operations of 1230 may be performed in accordance with examples as disclosed herein. In some examples, aspects of the operations of 1230 may be performed by an indication receiving component 745 as described with reference to FIG. 7.

A method for data processing at an application server is described. The method may include establishing an open connection for responding to a plurality of requests from a plurality of clients supported by the application server, the open connection remaining active until the plurality of requests have been processed; establishing, for at least one client of the plurality of clients, a set of queues configured for storing requests received from the at least one client via the open connection; selecting one or more requests from the set of queues based at least in part on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration; transmitting the one or more requests to a set of data processing servers connected to the application server; and receiving, from the set of data processing servers, an indication that the one or more requests have been processed.

An apparatus for data processing at an application server is described. The apparatus may include a processor, memory coupled with the processor, and instructions stored in the memory. The instructions may be executable by the processor to cause the apparatus to establish an open connection for responding to a plurality of requests from a plurality of clients supported by the application server, the open connection remaining active until the plurality of requests have been processed; establish, for at least one client of the plurality of clients, a set of queues configured for storing requests received from the at least one client via the open connection; select one or more requests from the set of queues based at least in part on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration; transmit the one or more requests to a set of data processing servers connected to the application server; and receive, from the set of data processing servers, an indication that the one or more requests have been processed.

Another apparatus for data processing at an application server is described. The apparatus may include means for establishing an open connection for responding to a plurality of requests from a plurality of clients supported by the application server, the open connection remaining active until the plurality of requests have been processed; means for establishing, for at least one client of the plurality of clients, a set of queues configured for storing requests received from the at least one client via the open connection; means for selecting one or more requests from the set of queues based at least in part on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration; means for transmitting the one or more requests to a set of data processing servers connected to the application server; and means for receiving, from the set of data processing servers, an indication that the one or more requests have been processed.

A non-transitory computer-readable medium storing code for data processing at an application server is described. The code may include instructions executable by a processor to establish an open connection for responding to a plurality of requests from a plurality of clients supported by the application server, the open connection remaining active until the plurality of requests have been processed; establish, for at least one client of the plurality of clients, a set of queues configured for storing requests received from the at least one client via the open connection; select one or more requests from the set of queues based at least in part on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration; transmit the one or more requests to a set of data processing servers connected to the application server; and receive, from the set of data processing servers, an indication that the one or more requests have been processed.

Some examples of the method, apparatuses, and non-transitory computer-readable medium described herein may further include operations, features, means, or instructions for transmitting, to the at least one client and based at least in part on receiving the indication from the set of data processing servers, a message indicating that the one or more requests have been processed.

Some examples of the method, apparatuses, and non-transitory computer-readable medium described herein may further include operations, features, means, or instructions for identifying a first sequential group of requests from the set of queues and a second sequential group of requests from the set of queues, wherein selecting the one or more requests is based at least in part on identifying the first sequential group of requests and the second sequential group of requests.

In some examples of the method, apparatuses, and non-transitory computer-readable medium described herein, the first sequential group of requests may be associated with a first start pointer and a first end pointer, the first start pointer corresponding to a first request in the first sequential group of requests, the first end pointer corresponding to a last request in the first sequential group of requests and the second sequential group of requests may be associated with a second start pointer and a second end pointer, the second start pointer corresponding to a first request in the second sequential group of requests, the second end pointer corresponding to a last request in the second sequential group of requests.

Some examples of the method, apparatuses, and non-transitory computer-readable medium described herein may further include operations, features, means, or instructions for incrementing the first start pointer and the first end pointer based at least in part on a time difference between the first request in the first sequential group of requests and the last request in the first sequential group of requests.

Some examples of the method, apparatuses, and non-transitory computer-readable medium described herein may further include operations, features, means, or instructions for incrementing the second start pointer and the second end pointer when the second sequential group of requests is empty and a predefined amount of time has elapsed.

In some examples of the method, apparatuses, and non-transitory computer-readable medium described herein, selecting the one or more requests may include operations, features, means, or instructions for selecting the one or more requests from the set of queues based at least in part on the first sequential group of requests and the second sequential group of requests comprising the one or more requests.

In some examples of the method, apparatuses, and non-transitory computer-readable medium described herein, one or both of the first sequential group of requests or the second sequential group of requests may be associated with a constant length.

In some examples of the method, apparatuses, and non-transitory computer-readable medium described herein, the first sequential group of requests may be used for rate limit control and the second sequential group of requests may be used for burst limit control.

Some examples of the method, apparatuses, and non-transitory computer-readable medium described herein may further include operations, features, means, or instructions for receiving the one or more requests from the at least one client during a first time period, storing the one or more requests in the set of queues, and selecting the one or more requests from the set of queues during a second time period that is subsequent to the first time period.

In some examples of the method, apparatuses, and non-transitory computer-readable medium described herein, the one or more requests comprise one or more respective fields indicating whether the one or more requests have been processed.

In some examples of the method, apparatuses, and non-transitory computer-readable medium described herein, the set of queues may be associated with a size that is based at least in part on a processing capability of the application server, a quantity of clients supported by the application server, or both.

Some examples of the method, apparatuses, and non-transitory computer-readable medium described herein may further include operations, features, means, or instructions for generating a plurality of timestamps for the plurality of requests based at least in part on receiving the plurality of requests from the plurality of clients via the open connection, wherein selecting the one or more requests from the set of queues is based at least in part on the plurality of timestamps.

In some examples of the method, apparatuses, and non-transitory computer-readable medium described herein, selecting the one or more requests may include operations, features, means, or instructions for selecting the one or more requests from the set of queues based at least in part on priority levels associated with the one or more requests.

In some examples of the method, apparatuses, and non-transitory computer-readable medium described herein, a first queue from the set of queues may be configured to store requests associated with a first priority level and a second queue from the set of queues may be configured to store requests associated with a second priority level that is different from the first priority level.

In some examples of the method, apparatuses, and non-transitory computer-readable medium described herein, the open connection comprises a WebSocket-based connection or a server-side event-based connection.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing at an application server, comprising:
    establishing an open connection for responding to a plurality of requests from a plurality of clients supported by the application server, the open connection remaining active until the plurality of requests have been processed;
    establishing, for at least one client of the plurality of clients, a set of queues configured for storing requests received from the at least one client via the open connection;
    selecting one or more requests from the set of queues based at least in part on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration;
    transmitting the one or more requests to a set of data processing servers connected to the application server; and
    receiving, from the set of data processing servers, an indication that the one or more requests have been processed.

2. The method of claim 1, further comprising:
    transmitting, to the at least one client and based at least in part on receiving the indication from the set of data processing servers, a message indicating that the one or more requests have been processed.

3. The method of claim 1, further comprising:
    identifying a first sequential group of requests from the set of queues and a second sequential group of requests from the set of queues, wherein selecting the one or more requests is based at least in part on identifying the first sequential group of requests and the second sequential group of requests.

4. The method of claim 3, wherein:
    the first sequential group of requests is associated with a first start pointer and a first end pointer, the first start pointer corresponding to a first request in the first sequential group of requests, the first end pointer corresponding to a last request in the first sequential group of requests; and
    the second sequential group of requests is associated with a second start pointer and a second end pointer, the second start pointer corresponding to a first request in the second sequential group of requests, the second end pointer corresponding to a last request in the second sequential group of requests.

5. The method of claim 4, further comprising:
    incrementing the first start pointer and the first end pointer based at least in part on a time difference between the first request in the first sequential group of requests and the last request in the first sequential group of requests.

6. The method of claim 4, further comprising:
    incrementing the second start pointer and the second end pointer when the second sequential group of requests is empty and a predefined amount of time has elapsed.

7. The method of claim 3, wherein selecting the one or more requests comprises:
    selecting the one or more requests from the set of queues based at least in part on the first sequential group of requests and the second sequential group of requests comprising the one or more requests.

8. The method of claim 3, wherein one or both of the first sequential group of requests or the second sequential group of requests is associated with a constant length.

9. The method of claim 3, wherein the first sequential group of requests is used for rate limit control and the second sequential group of requests is used for burst limit control.

10. The method of claim 1, further comprising:
    receiving the one or more requests from the at least one client during a first time period;
    storing the one or more requests in the set of queues; and
    selecting the one or more requests from the set of queues during a second time period that is subsequent to the first time period.

11. The method of claim 1, wherein the one or more requests comprise one or more respective fields indicating whether the one or more requests have been processed.

12. The method of claim 1, wherein the set of queues is associated with a size that is based at least in part on a processing capability of the application server, a quantity of clients supported by the application server, or both.

13. The method of claim 1, further comprising:
    generating a plurality of timestamps for the plurality of requests based at least in part on receiving the plurality of requests from the plurality of clients via the open connection, wherein selecting the one or more requests from the set of queues is based at least in part on the plurality of timestamps.

14. The method of claim 1, wherein selecting the one or more requests comprises:
    selecting the one or more requests from the set of queues based at least in part on priority levels associated with the one or more requests.

15. The method of claim 1, wherein:
a first queue from the set of queues is configured to store requests associated with a first priority level; and
a second queue from the set of queues is configured to store requests associated with a second priority level that is different from the first priority level.

16. The method of claim 1, wherein the open connection comprises a WebSocket-based connection or a server-side event-based connection.

17. An apparatus for data processing at an application server, comprising:
a processor;
memory coupled with the processor; and
instructions stored in the memory and executable by the processor to cause the apparatus to:
establish an open connection for responding to a plurality of requests from a plurality of clients supported by the application server, the open connection remaining active until the plurality of requests have been processed;
establish, for at least one client of the plurality of clients, a set of queues configured for storing requests received from the at least one client via the open connection;
select one or more requests from the set of queues based at least in part on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration;
transmit the one or more requests to a set of data processing servers connected to the application server; and
receive, from the set of data processing servers, an indication that the one or more requests have been processed.

18. The apparatus of claim 17, wherein the instructions are further executable by the processor to cause the apparatus to:
transmit, to the at least one client and based at least in part on receiving the indication from the set of data processing servers, a message indicating that the one or more requests have been processed.

19. The apparatus of claim 17, wherein the instructions are further executable by the processor to cause the apparatus to:
identify a first sequential group of requests from the set of queues and a second sequential group of requests from the set of queues, wherein selecting the one or more requests is based at least in part on identifying the first sequential group of requests and the second sequential group of requests.

20. A non-transitory computer-readable medium storing code for data processing at an application server, the code comprising instructions executable by a processor to:
establish an open connection for responding to a plurality of requests from a plurality of clients supported by the application server, the open connection remaining active until the plurality of requests have been processed;
establish, for at least one client of the plurality of clients, a set of queues configured for storing requests received from the at least one client via the open connection;
select one or more requests from the set of queues based at least in part on a rate limit threshold of the application server and a burst limit threshold of the application server, the rate limit threshold defining a number of requests that the application server can process within a first time duration, the burst limit threshold defining a number of requests that the application server can process within a second time duration that is shorter than the first time duration;
transmit the one or more requests to a set of data processing servers connected to the application server; and
receive, from the set of data processing servers, an indication that the one or more requests have been processed.

* * * * *